April 11, 1939.   W. S. THOMPSON   2,153,947
FASTENER FOR GROUND WORK
Original Filed March 30, 1936   2 Sheets-Sheet 1
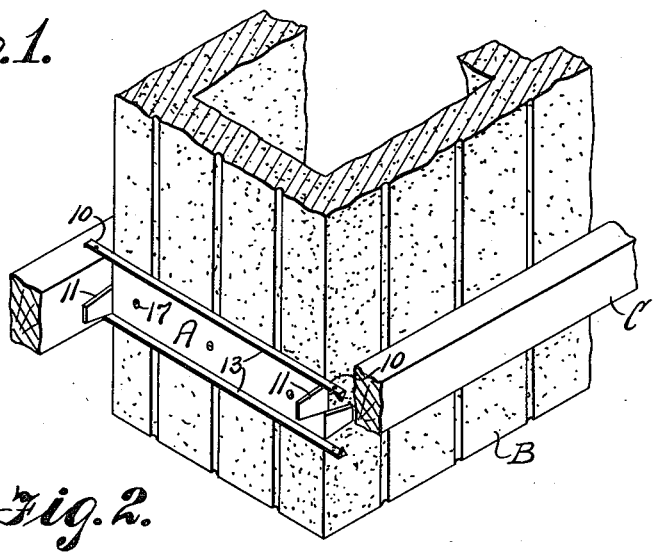
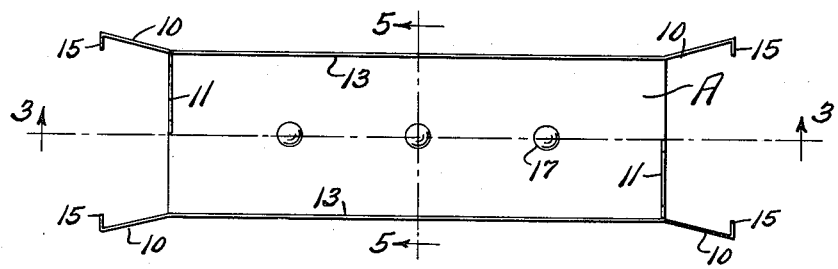
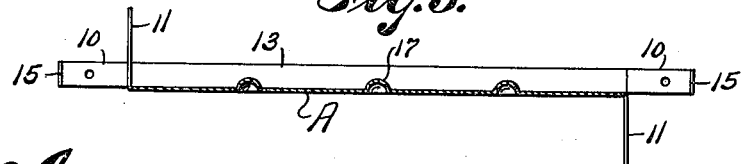
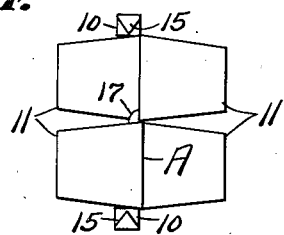
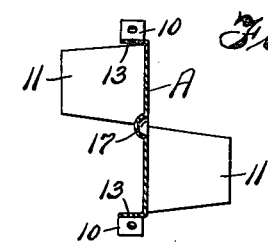
William S. Thompson
INVENTOR
BY Victor J. Evans & Co.
ATTORNEY April 11, 1939.  W. S. THOMPSON  2,153,947
FASTENER FOR GROUND WORK
Original Filed March 30, 1936  2 Sheets-Sheet 2
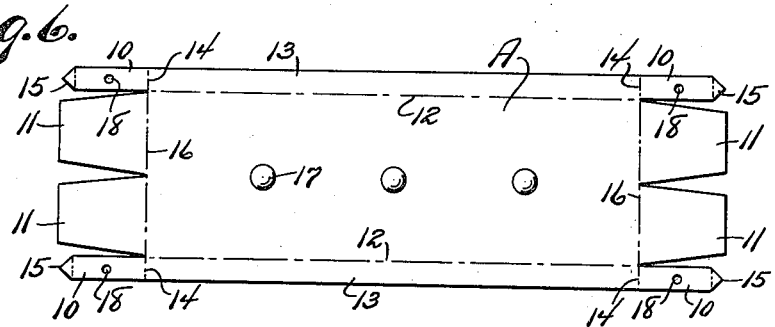
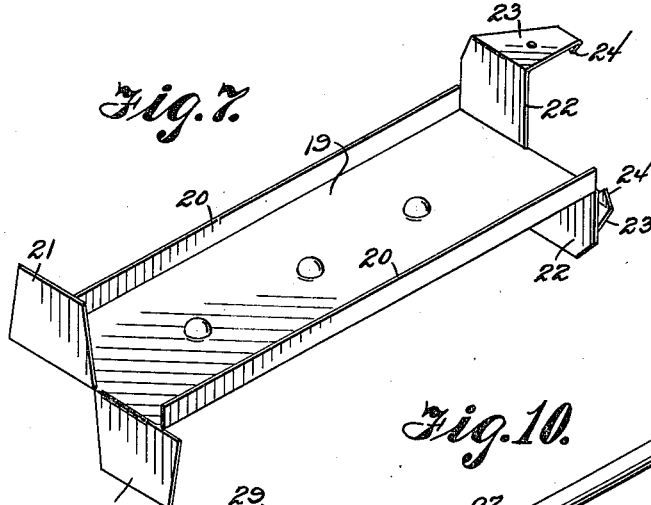
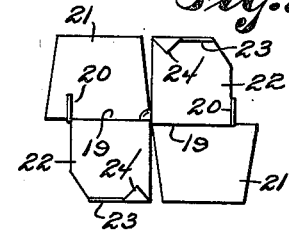
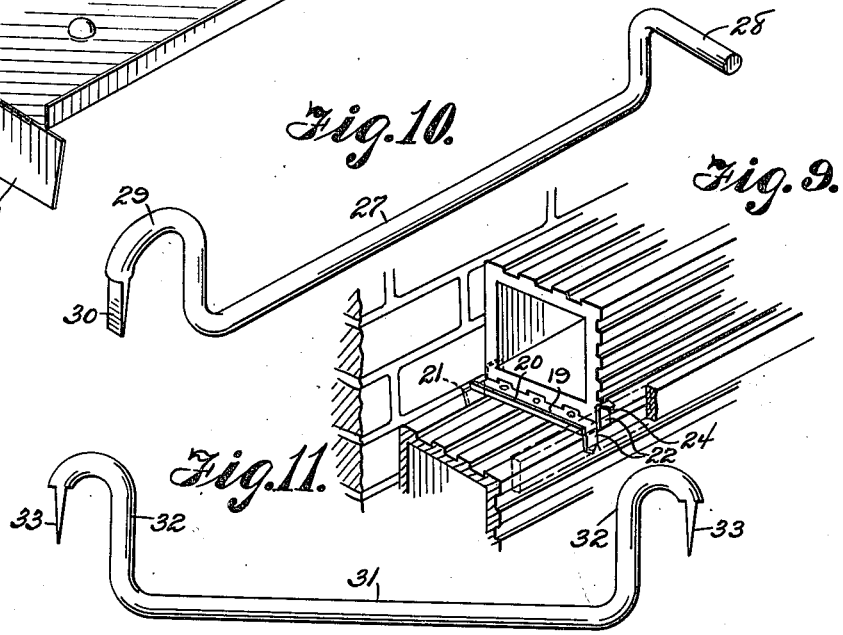
William S. Thompson
INVENTOR
BY Victor J. Evans & Co.
ATTORNEY Patented Apr. 11, 1939

2,153,947

UNITED STATES PATENT OFFICE 2,153,947

FASTENER FOR GROUND WORK

William S. Thompson, Lebanon, Ohio

Application March 30, 1936, Serial No. 71,791
Renewed December 30, 1938

3 Claims. (Cl. 72—101)

The invention relates to a grounding system and more especially to fasteners for ground strips and frames employed in building construction.

The primary object of the invention is the provision of a fastener of this character, wherein the same in its construction can be set in the joints between the units of a wall such as cement wall blocks, tiles, brick, for the placement of ground work such as strips, frames or the like and thereby avoiding the necessity of the use of nails or other like fasteners, the fastener being also applicable to plaster or other partitions or walls of fire-proof material.

Another object of the invention is the provision of a fastener of this character, wherein the same can be readily and conveniently set in mortar tying building units together and can be placed at varying heights in a wall so that ground work can be conveniently attached without necessitating the plugging, blocking, nailing or otherwise fastening of this ground work in place.

A further object of the invention is the provision of a fastener of this character, wherein the construction thereof is novel in form in that the same can be anchored in a wall by the mortar set with the wall for the fastening of ground strips in place relative to said wall at one or both sides thereof.

A still further object of the invention is the provision of a fastener of this character, which is inexpensive, easy of construction, assuring firm and secure fastening of ground work to the plaster, tile or other such like fire-proof walls or partitions, strong, and durable.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a fragmentary perspective view of a tile wall showing a fastener constructed in accordance with the invention applied thereto with ground strips in position for fastening.

Figure 2 is an elevation of the fastener.

Figure 3 is a sectional view on the line 3—3 of Figure 2 looking in the direction of the arrows.

Figure 4 is an end elevation.

Figure 5 is a sectional view on the line 5—5 of Figure 2 looking in the direction of the arrows.

Figure 6 is a plan view of the blank from which the fastener is made prior to the bending into proper shape.

Figure 7 is a perspective view of a modified form of fastener.

Figure 8 is an end elevation thereof.

Figure 9 is a view similar to Figure 1 showing the application of the fastener as disclosed in Figures 7 and 8.

Figure 10 is a perspective view of a further modification of fastener.

Figure 11 is a perspective view of a still further modification of fastener.

Similar reference characters indicate corresponding parts throughout the several views in the drawings.

Referring to Figures 1 to 6 of the drawings, the fastener constituting the present invention comprises a sheet metal section A which is of elongated formation cut to provide outer tongues 10 and intermediate tongues 11, respectively, at opposite ends thereof. This section is adapted to be folded on the lines 12 to provide flanges 13 at right angles to the said section and these flanges are supplemented by the tongues 10 which are bendable along lines 14 and have spur tips 15. The tongues 11 are reversely bent to each other along lines 16 at right angles to the section A while provided at the longitudinal center of the section A are outstruck studs or lugs 17, preferably arranged in a straight row and uniformly spaced from each other.

In the use of the fastener previously described after the shaping thereof with the flanges 13, the tongues 10 and 11 disposed as shown in Figures 1, 2 and 3 of the drawings, the said fastener is placed transversely of a joint between tiles adjacent to each other of a wall, one of the tiles being indicated at B, so that the reversely bent tongues 11 will overlap these tiles adjacent to each other at opposite side faces of the latter while the tongues 10 will protrude beyond the said side faces so that they can overlap the top and bottom edges of ground strips C as may be placed against opposite side faces of said wall. Thereafter, the tips 15 of the tongues 10 can be driven into the ground strips C and in this manner the latter will be made secure and anchored against the side facings of the wall.

The tongues 10 preferably are provided with apertures 18 through which can be passed nails, screws or the like for engagement in the ground strip C if found necessary.

In Figures 7, 8 and 9 of the drawings there is shown a modification of fastener wherein the section 19 has the flanges 20 at the longer edges thereof and the reversely bent end ears 21, these being at right angles to the section 19 and at one end only thereof. At the other end of the section 19 are the reversely bent ears 22, these being at right angles to the said section. Formed with these ears 22 are right angle extensions 23 having spur tips 24. This fastener involving the section 19 is placed between tiles 25 horizontally disposed so as to lie in the joint between said tiles with the ears 22 overlapping one side face of superposed tiles adjacent to each other while the ears 22 are exposed at the other face and the extensions 23 at the spur tips 24 engage in a ground strip 26 for the fastening and anchoring thereof at the horizontal joint between the tiles 25. This fastener of the modified form just described is adapted for a single ground strip 26.

In Figure 10 of the drawings there is shown a further modification wherein the fastener involves a round metal rod or bar 27 having an upturned substantially L-shaped terminal 28 at one end and an upturned goose neck-like hook 29 at the other end. This hook is formed with a pointed bill 30 and such fastener can be substituted for the fastener shown in Figures 7, 8 and 9.

In Figure 11 of the drawings there is shown a still further modification wherein the fastener involves a round rod or bar 31 having upturned goose neck-like hooks 32 at opposite ends, these being formed with pointed bills 33 and this fastener may be substituted for the fastener shown in Figures 1 to 6 inclusive. The bills 33 are driven into the ground strips C disposed at opposite side faces of the wall while the rod or bar intermediate the hooks 32 is set in the mortar at a joint between units of a wall.

What is claimed is:

1. A fastener comprising a plate-like section formed with side flanges at substantially right angles thereto, extensions on said flanges and having spur tips for biting engagement with ground work, lugs projecting from said section, and tongues at opposite ends of the section and reversely bent to each other at substantially right angles to said section.

2. A fastener comprising a plate-like section having side flanges at substantially right angles thereto, said flanges having coextensive portions extending beyond the plate-like section provided with spur tips bent inwardly at right angles to said flanges, and a pair of tongues at each end of the plate-like section, the tongues of each pair being bent to opposite sides of the plate-like section and at substantially right angles thereto.

3. A fastener for ground work comprising a plate-like section having side flanges disposed at substantially right angles thereto, and outwardly diverging extensions on said flanges and having spur tips with their points disposed substantially in longitudinal alignment with said flanges, whereby when the spur tips are driven home in the ground work the extensions will be coextensive with said flanges.

WILLIAM S. THOMPSON.